United States Patent [19]

Garwin et al.

[11] Patent Number: 4,511,760
[45] Date of Patent: Apr. 16, 1985

[54] FORCE SENSING DATA INPUT DEVICE RESPONDING TO THE RELEASE OF PRESSURE FORCE

[75] Inventors: Richard L. Garwin, Scarsdale; James L. Levine, Yorktown Heights, both of N.Y.

[73] Assignee: International Business Machines Corporation, Armonk, N.Y.

[21] Appl. No.: 497,290

[22] Filed: May 23, 1983

[51] Int. Cl.³ .................. G08C 21/00; G01G 3/14; H04N 1/00
[52] U.S. Cl. .................................................. 178/18
[58] Field of Search ................................ 178/18, 19

[56] References Cited

U.S. PATENT DOCUMENTS

| | | | |
|---|---|---|---|
| 3,657,475 | 4/1972 | Peronneau et al. | 178/18 |
| 3,806,642 | 4/1974 | Veith et al. | 178/18 |
| 3,940,637 | 2/1976 | Ohigashi et al. | 310/339 |
| 4,121,049 | 10/1978 | Roeber | 178/18 |
| 4,318,096 | 3/1982 | Thornburg et al. | 178/18 X |
| 4,323,888 | 4/1982 | Cole | 340/365 A |
| 4,340,777 | 7/1982 | DeCosta et al. | 178/18 |
| 4,355,202 | 10/1982 | DeCosta et al. | 178/18 |
| 4,389,711 | 6/1983 | Hotta et al. | 364/556 |

FOREIGN PATENT DOCUMENTS 1528581  10/1978  United Kingdom .

OTHER PUBLICATIONS

IBM Technical Disclosure Bulletin, vol. 24, No. 6, Nov. 1981, pp. 2732–2733, R. H. Harris, "Optical Overlay Input Device for a Cathode Ray Tube".

Primary Examiner—Stafford D. Schreyer
Attorney, Agent, or Firm—Alvin J. Riddles

[57] ABSTRACT

A force-sensing data input device of very high accuracy and a method for operating such a force-sensing input device. An input surface is provided having a transparent faceplate which conforms to the display surface of a display device, such as a cathode-ray tube display, with which the input device is used. A flange of the input surface is separated from a rigid, conductive reference surface or frame by force-sensing piezoelectric transducers, preferably constructed of lead-zirconium titanate. At least portions of the piezoelectric transducers which are sensitive to electromagnetic interference are located within wells formed in the frame so as to be shielded. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum for the pushing direction. The individual outputs of the four sensors at the time that the peak of the sum occurs are used to calculate the point of application of the force.

30 Claims, 10 Drawing Figures

FORCE SENSING DATA INPUT DEVICE RESPONDING TO THE RELEASE OF PRESSURE FORCE

DESCRIPTION

1. Technical Field

The invention pertains to a data entry device for a computer system. More particularly, the invention pertains to a touch-type data entry device intended to be used with a cathode-ray tube display device or the like driven by a central processing unit of the computer system.

In the type of data entry device to which the invention pertains, the user presses his finger against a faceplate of the cathode-ray tube display, the position of his finger is sensed, and the signal representing the sensed position is digitized and entered into the central processing unit of the computer system. The data thus provided to the central processing unit may, for instance, be used for determining a type of data processing subroutine to be performed by the central processing unit.

2. Background Art

The increasing use of microcomputers, particularly, microcomputers associated with cathode-ray tube display devices or the like, has created an increased demand for simpler and yet more powerful techniques of interacting with the computer system. Particularly, there has been a growing demand for ways for the user of the system to enter his choice among various functions (subroutines) to be performed by the computer system.

For instance, in an automated teller station for use by a bank, a number of choices are displayed on a cathode-ray tube screen among which the user must choose.

An early approach was to provide dedicated program function keys, each of which was associated with a dedicated choice or subroutine. If a large number of choices were available, this approach was not acceptable because large numbers of program function keys would be required. To overcome this problem, a typical solution was to identify each choice with a number or alphanumeric indicator displayed on the screen and to require the user to enter the number or alphanumeric indicator on a keyboard to communicate his choice to the computer system. Again, this approach is not fully acceptable because it requires the user to locate his choice on a "menu" displayed on the screen, remember its number or indicator, and then enter his choice on the keyboard, all of which is time consuming and open to error.

A yet further approach to the problem was to provide a light pen for selection. An example of such a system is disclosed in U.S. Pat. No. 4,318,096 to Thornburg et al. In this system, the user picks up then positions the light pen over an area on the display screen corresponding to his particular choice. The light pen produces an output pulse when the raster scanning beam of the cathode-ray tube display scans the position where the light pen has been placed. The output signal from the light pen can then be correlated with the signals which control the scanning of the electron beam of the cathode-ray tube to permit the computation of values representing the position of the light pen on the display surface. A similar system employing an acoustic probe is seen in U.S. Pat. No. 3,806,642 to Veith et al. A still further, and relatively new, device of this same general type known as a "mouse" has received attention. The "mouse" is rolled across a table or other work surface to move a cursor incrementally onto the menu item desired. Because the cursor may cross other items before reaching the desired one, the "mouse" is provided with a push-button to indicate the final selection.

All of these systems are disadvantageous in that they require the user to manually pick up a pen, probe or "mouse", carefully locate it at the desired position on the display surface, and then replace the pen, probe or "mouse" in its holder. Such action is of course time consuming. Moreover, due to parallax problems, the accuracy of the pen or probe was limited. Still further, such approaches are not very acceptable for stations which must be accessed by the general public due to the possibility of theft or vandalism of the pen, probe or "mouse".

More recently, touch-sensitive devices have been proposed for providing a more direct way of interacting with the displayed information. In such devices, a transparent plate is positioned over the cathode-ray tube and sensors are attached to the transparent plate which generate signals from which the position where the user has placed his finger can be calculated. Indicator touch areas, termed "soft keys", are displayed upon the screen of the cathode-ray tube alongside soft key identifying labels. An example of this is shown in FIG. 1 for an automatic bank teller application. In the left-hand column are displayed four soft keys and respective identifiers 12 corresponding to functions of WITHDRAW, DEPOSIT, TO/FROM CHECKING, and TO/FROM SAVINGS. The soft keys 14 are produced by merely displaying rectangles of appropriate dimensions. In the right-hand column similar soft keys 13 are displayed alongside other identifiers 11, here, amounts of money. For example, to withdraw $50 from his checking account, the user would first press his finger above the soft key 14 associated with the identifier WITHDRAW, after which he would press his finger against the soft key area 13 identified by $50. The computer's central processing unit would then effect the issue to the user of $50.00 and debit his account accordingly.

Prior art examples of data entry devices of this general type will now be described.

Peronneau et al. in U.S. Pat. No. 3,657,475 teach a position-indicating system in which a rigid plate is fixed to a display surface by at least three spaced-apart sensors. The outputs of the sensors are electronically processed to determine the position of the user's finger. The sensors may be piezoelectric elements which produce an output which is proportional to the magnitude of the applied force. Although the system of Peronneau et al. was capable of producing signals roughly indicative of the point where the user applies his finger, nevertheless, the system was not fully acceptable because a considerable amount of error is inherent in the device. The error primarily arises from the arrangement used for mounting the plate. Particularly, the edges of the rigid plate of Peronneau et al. are mounted between the force-sensing devices and a rigid block. Because the planar surfaces of the force-sensing devices are rigidly fixed to the surface of the plate, each force-sensing device exerts a moment or torque on the plate which adversely effects the measurements of the other force-sensing devices.

U.S. Pat. No. 4,121,049 to Roeber teaches a positioning and force measuring apparatus which includes an input surface joined to a rigid reference surface through leaf springs arranged along the four sides of the input surface. The input springs have the shape of a cylinder sliced longitudinally. Sensors in the form of strain gauges are located at predetermined positions on the outer surfaces of the springs. When the user applies his finger to the input surface, the springs are deformed, causing outputs to be produced from the strain gauge sensors in magnitudes related to the magnitude of the applied force and the distance between the respective sensors and the point of application of the user's finger. The accuracy of this device is limited in that a large amount of visual parallax error is unavoidable due to the necessary separation of the input surface from the display surface by the thickness of the springs and the reference surface. Further, the accuracy of the device is limited by the variability of the spring constants of the half-cylindrical springs.

In an attempt to overcome some of the disadvantages of the above-discussed devices, DeCosta et al. in U.S. Pat. Nos. 4,340,777 and 4,355,202 provide a position locating system in which the display screen input surface is attached to a rigid body reference surface via pointed members having a base supported by four sensors, which may take the form of piezoelectric elements. Although the approach of DeCosta et al. may have overcome some of the disadvantages of the earlier data entry devices, nevertheless, it was still not entirely satisfactory in accuracy for many applications. Particularly, it has been found that a typical user will apply a force with his finger to the input surface which has components in the direction tangential to the input surface as well as perpendicular thereto as his finger presses against the input surface. These tangential components of the applied force can still produce an inaccurate output in the system of DeCosta et al.

Of somewhat lesser interest, Cole in U.S. Pat. No. 4,323,888 describes a keyboard system with an automatic repeat capability in which "key" areas are printed on a rigid plate. The plate is supported from a rigid reference surface via transducers, typically piezoelectric-type transducers. The outputs of all four transducers are summed together to produce an output signal representative of the applied pressure. The duration of this pressure signal is utilized to generate a signal indicative of the repeat function. No description is given as to how signals could be produced which are representative of the point of application of the user's finger.

U.S. Pat. No. 3,940,637 to Ohigashi et al. discloses a data entry key in which a piezoelectric polymer film is utilized in a dome-shaped key element. When the key element is depressed, output pulses are produced across the piezoelectric polymer film at both the time of pressing and the time of release. The pulse produced at the time of release is less well defined (has longer rise and fall times) than the pulse produced at the time of pushing.

DISCLOSURE OF THE INVENTION

The invention provides a force-sensing data input device for use with a cathode-ray tube display which includes a transparent faceplate contoured to conform to the display surface of the cathode-ray tube, a flange which may have a side wall for supporting the transparent faceplate, a rigid mounting frame positioned generally parallel to the faceplate having a plurality of wells formed therein, a plurality of force-sensing means disposed at least partially within respective ones of the wells with the force-sensing means holding apart the flange and the frame, and means for applying a spring force for urging the flange and frame toward one another. The force-sensing means are preferably piezoelectric transducers, more preferably, lead-zirconium titanate piezoelectric transducers. Either three or four transducers may be used. Rubber pads are provided on both sides of the piezoelectric transducers for preventing breakage and allowing for thermal expansion. Clip springs may be used for applying the spring force.

Further, the invention may be practiced by a method for determining the point of application of a force on a force-sensing data input device in which a plurality of force-sensing means are disposed at predetermined positions between an input surface and a reference surface. This method includes steps of summing outputs from each of the force-sensing means, detecting whether this sum exceeds a first predetermined threshold for pushing, determining whether the sum exceeds a second predetermined threshold of opposite polarity from the first threshold during release of the force, detecting a subsequent peak magnitude of the sum, and determining the point of application of the force in accordance with values of outputs from each of the force-sensing means present at the time that the peak magnitude of the sum of the outputs is detected. The step of determining whether the sum exceeds the second predetermined threshold is inhibited until the first threshold is exceeded. Similarly, the step of detecting the peak magnitude of the sum is inhibited until the second threshold is exceeded. Preferably, each of the outputs of the force-sensing means is filtered prior to the step of summing. In a preferred embodiment, the filtering is carried out in two steps, an analog step and a digital step, both of which are low-pass filtering steps. The effective cut-off frequency for digital filtering should be lower than that for analog filtering so as to provide absolute uniformity among the outputs of the force-sensing means.

Figure 2:
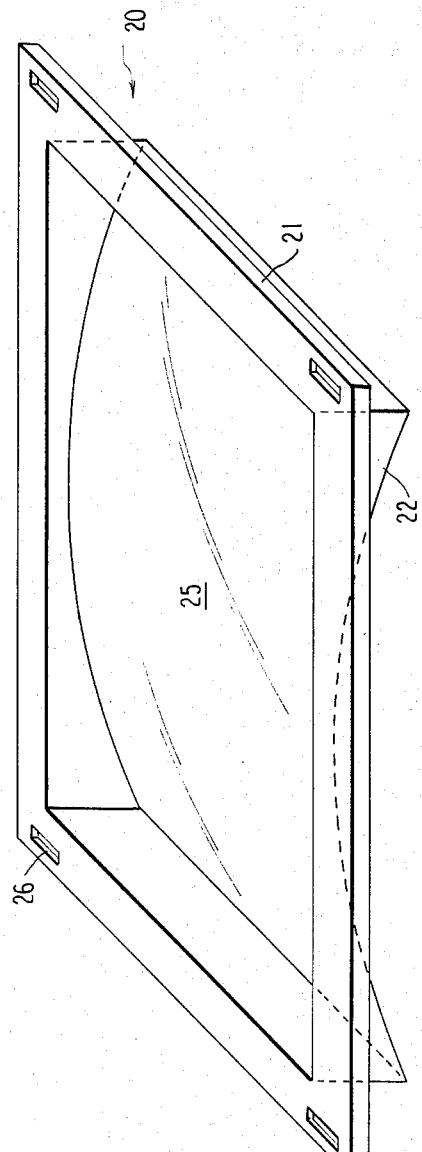
FIG. 2 is a perspective view of a faceplate assembly which forms a part of the data entry device of the invention.

The best mode for practicing the invention now known to the applicants will now be described in more detail with reference to FIG. 2 which shows a perspective view of a faceplate assembly utilized in the data entry device of the invention. The faceplate assembly 20 includes a contoured faceplate 25 which is shaped to fit closely to the curved surface of the particular cathode-ray tube with which the data entry device is to be used. The contoured faceplate 25 is joined to a cutout, rectangularly shaped flange 21 through supporting side walls 22. The entire faceplate assembly may be molded as an integral unit. In any event, it is of course necessary that the contoured faceplate 25 be transparent.

Figure 3:
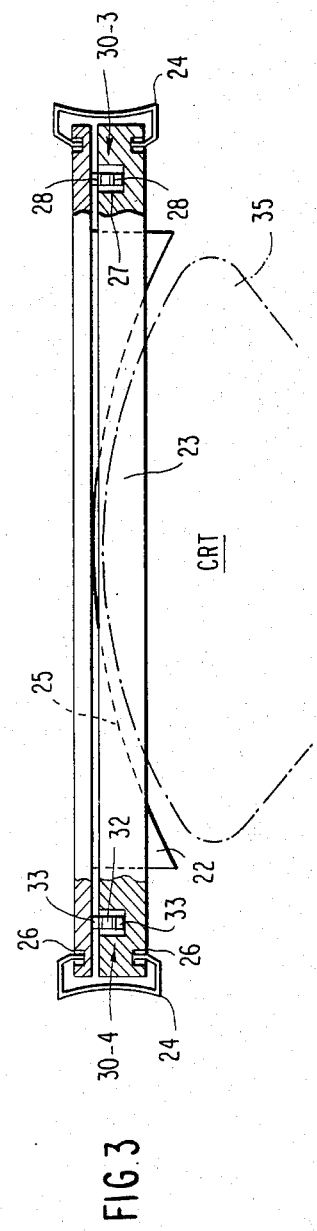
FIG. 3 is a side view showing the faceplate assembly of FIG. 2 mounted to a rigid support frame and positioned over cathode-ray tube.

Next, referring to FIG. 3, the faceplate assembly 20 is attached to a rigid mounting plate 23 via force transducers 32. Spring clips 24 hold the faceplate assembly 20 to the mounting plate 23. The spring constants of the clips 24 should be sufficiently high that a compressive force is exerted on all transducers 32 for all possible orientations of the faceplate assembly 20. Notches 26 may be formed in both the faceplate 20 and the mounting plate 30 to accommodate the spring clips 24.

The mounting plate 23 has a cutout formed therein of a shape and size to permit the lateral sides of the contoured faceplate 23 and supporting side walls 22 to be received therein. The mounting plate 23 is rigidly mounted at a position such that the faceplate 25 is uniformly spaced from the face of the cathode-ray tube 35 (indicated in FIG. 3 in phantom) with a small gap of predetermined dimensions left therebetween.

The mounting plate 23 is formed of a conductive material, preferably aluminum or metallized plastic. Wells 27 are formed in the mounting plate 23 to receive respective ones of the transducers 32. In accordance with one important aspect of the invention, the transducers 32 are positioned sufficiently below the surface of the mounting plate 23 as to be effectively shielded from noise in the form of stray electromagnetic radiation. The mounting plate 23 should thus be connected to the system ground to enhance the shielding effect.

Figure 4:
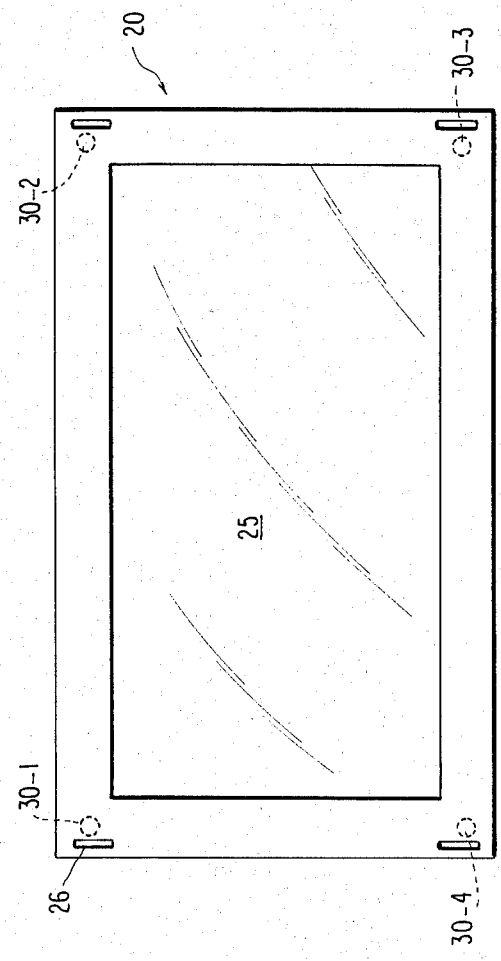
FIG. 4 is a front view of the faceplate assembly of FIG. 3.

Electrodes 28 in the form of Be-Cu foil leads are connected to each of the transducers 32. Wires are connected to these electrodes 28 and can be led out through channels (not shown) cut into the surface of the mounting plate 23. Rubber pads are provided on both sides of the transducers 32 to prevent breakage of the transducers 32 and to allow for thermal expansion. In the example given, a thickness of about 0.25 mm is acceptable for the rubber pads 33. Each assembly of transducer 32, electrode 28 and two rubber pads 33 is herein termed a sensor and identified by one of reference numerals 30-1 to 30-4. The sensors 30-1 to 30-2 are positioned adjacent the four corners of the faceplate 25 as shown in FIG. 4.

Each of the transducers 32 is implemented with a slab or disk of a piezoelectric material. A diameter of about 7 mm and a thickness of about 0.25 mm is acceptable. The preferred material is a ceramic piezoelectric material, most preferably lead-zirconium titanate. Barium titanate is a further material which may possibly be used, but lead-zirconium titanate is preferred because it provides a high output voltage (typically about 10 volts per pound of applied force), it can withstand compressive forces of hundreds of pounds, works well over a wide range of temperatures, and yet is very inexpensive. Also, a ceramic piezoelectric element of this type produces an output which has no DC component. This is advantageous in that uneven static forces on the four transducers do not contribute to and adversely affect the output signals from the transducers.

Although four transducers are employed in the embodiment shown in the drawings, three transducers in a triangular arrangement may be used as well.

Figure 5:
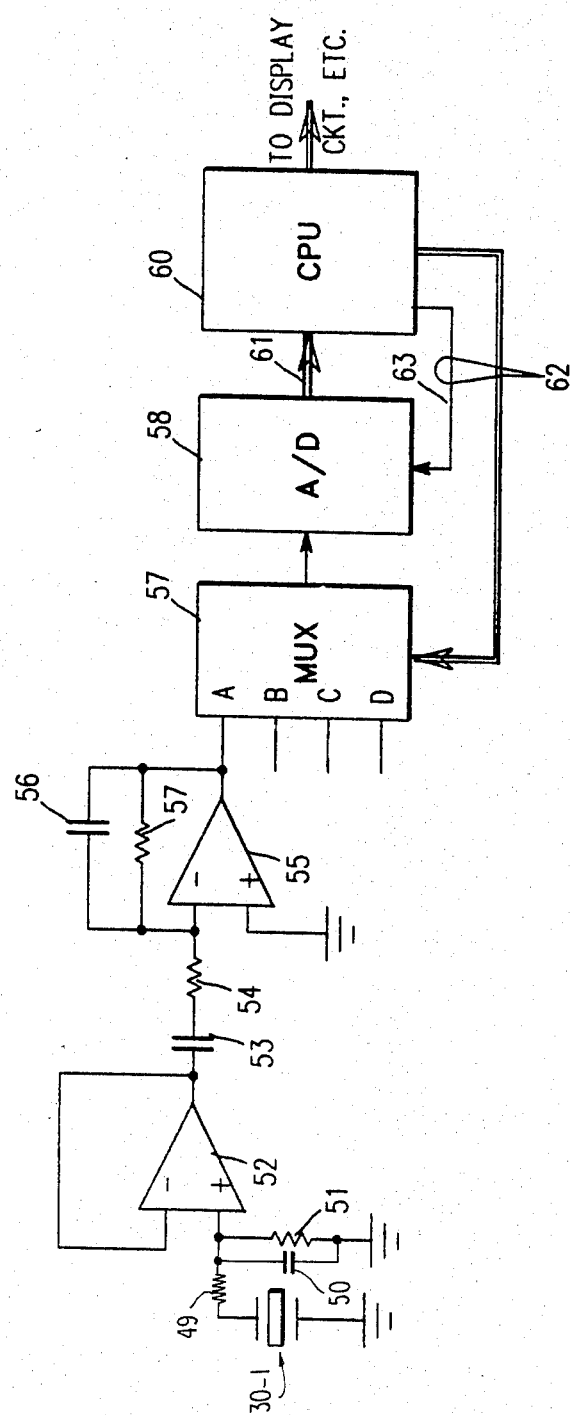
FIG. 5 is a schematic diagram of an electronic circuit used to process the output signals produced by transducers employed in the arrangement of FIG. 3.

The circuitry for processing the output signals from the sensors 30-1 to 30-4 will first be described with reference to FIG. 5. The output from each sensor 30-1 to 30-4 (30-1 in the example of FIG. 5) is applied to the noninverting input of a respective high-impedance operational amplifier 52 through a low-pass filter composed of resistors 49 and 51 and a capacitor 50. A JFET-type operational amplifier is preferred for its very high impedance and stability. To provide unity gain, the output of the amplifier 52 is connected back to its inverting input. The output of the operational amplifier 52 is AC coupled through a capacitor 53 and resistor 54 to the inverting input of a second operational amplifier 55. The values of the capacitor 50 and resistor 49 are chosen to eliminate unwanted transients from the output of the associated sensor which may be produced, for example, by a user striking his fingernail against the faceplate 25, and also to prevent amplifier overloading. Thus, the actual values of the capacitor 53 and resistor 54 must be determined taking into account the mass of the faceplate assembly 20, the spring constants of the spring clips 24, etc. of the particular input device.

A feedback capacitor 56 and a feedback resistor 57 are connected between the output and the inverting input of the second amplifier 55. The values of the capacitor 56 and resistor 57 should be determined to optimize the signal-to-noise ratio for typical release signals for the particular data entry device. One complete set of elements 51-57 is provided for each sensor 30-1 to 30-4, only one such set being shown in FIG. 5 for purposes of clarity.

The output of each of the four second amplifiers 55 is connected to a respective input of an analog multiplexer 57. The output of the multiplexer 57 is applied to the input of analog-to-digital converter 58, the digital output of which is connected to an input port of a computer 60. The computer 60 addresses the multiplexer 57 on a bus 62 with sequences of the four possible input selection values to periodically connect the outputs of the respective second amplifiers 55 in sequence to the input of the analog-to-digital converter 58. Digitized samples of the outputs of the second amplifiers 55 are thus supplied to the computer 60 at predetermined intervals. A clock pulse is also supplied to the analog-to-digital converter 58 on a line 63 of the bus 62 by the computer 60. The frequency of the clock pulse on the line 63 should, of course, be equal to the frequency of change of the addressing signal to the multiplexer 57, that is, for each new value of the address applied to the multiplexer 57, a clock pulse is applied to the analog-to-digital converter 58 on the line 63.

Figure 6A:
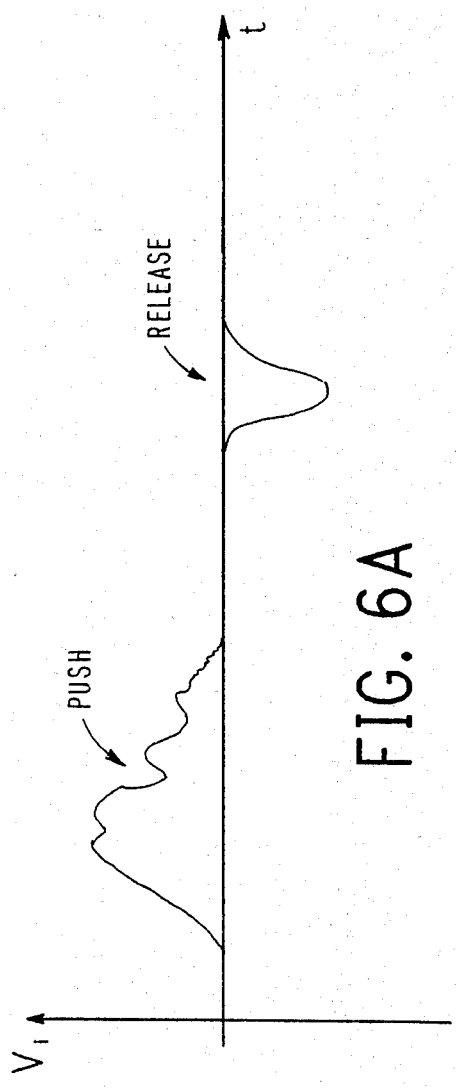
FIGS. 6A and 6B are waveform diagrams showing, respectively, a typical example of an output from one of the transducers of the arrangement of FIG. 3 as a user applies his finger to the data entry device and releases it, and of summed outputs from all four sensors.

FIG. 6A is a waveform diagram showing an output of one of the second amplifiers 55 for a typical push-release operation on the faceplate 25. FIG. 6A clearly illustrates that the pulse produced for pushing is less well defined in waveshape and is of longer duration than the pulse produced upon release. This is apparently due to the fact that an average user will release his finger from the faceplate much faster than he will push it against the faceplate. Moreover, it has been found experimentally that the release pulse is affected far less than the push pulse by lateral forces applied by the user. The invention takes advantage of the fact that the release pulse is better defined and more accurate than the push pulse to provide a data entry device having substantially improved accuracy over the prior art arrangements.

In accordance with another important aspect of the invention, output signals from the four sensors 30-1 to 30-4 accurately indicative of the position where the user has placed his finger are derived employing the following procedure. First, the output signals from all four sensors, that is, the output signals as filtered, digitized and applied to the computer 60, are summed together to produce a signal SUM (indicated in FIG. 6B). Then, the positive portion of the signal SUM (corresponding to the push pulse) is examined to determine if and when it exceeds a first threshold voltage $Th_1$. Once the threshold $Th_1$ is surpassed by SUM, it is accepted that a valid push on the faceplate has been detected. At that time, sensory feedback is provided to the user, for instance, by activating a beeper or flashing a light, so that he knows that the system has accepted his data entry. The release pulse is then awaited. The release pulse is not accepted as valid until it has crossed a second, negative threshold $Th_2$. The magnitude of $Th_2$ should be chosen large enough to ensure that the analog-to-digital converters have enough signal to minimize quantization errors. Preferably, the magnitude of $Th_2$ is one-third to one-half the magnitude of the threshold $Th_1$.

Once $Th_2$ has been exceeded, the peak of the release pulse is sought. The search of the peak of the release pulse is done by examining successive values of SUM and accepting as the peak value that value which occurs before SUM turns back towards zero. The sampled and filtered output signals from the four sensors 30-1 to 30-4 then present are used for computing X and Y, the position of application of the user's finger, in a manner to be described below.

If the user is slow to release his finger from the faceplate 25 causing an abnormal prolongation of the releasae pulse (as shown by a dotted line in FIG. 6B), this is taken as an indication that the release pulses from the various sensors are not as accurately indicative of the true point of application of the user's finger as is desired. For instance, such elongation or smearing of the release pulse will typically occur when the user is sliding his finger along the faceplate as he removes it from the faceplate. To eliminate such inaccuracies, the time from the instant that the first threshold $Th_1$ is crossed until the release pulse has crossed the second threshold $Th_2$ is detected. If this time exceeds a fixed reference time period, the data entry attempt is voided.

Figure 7:
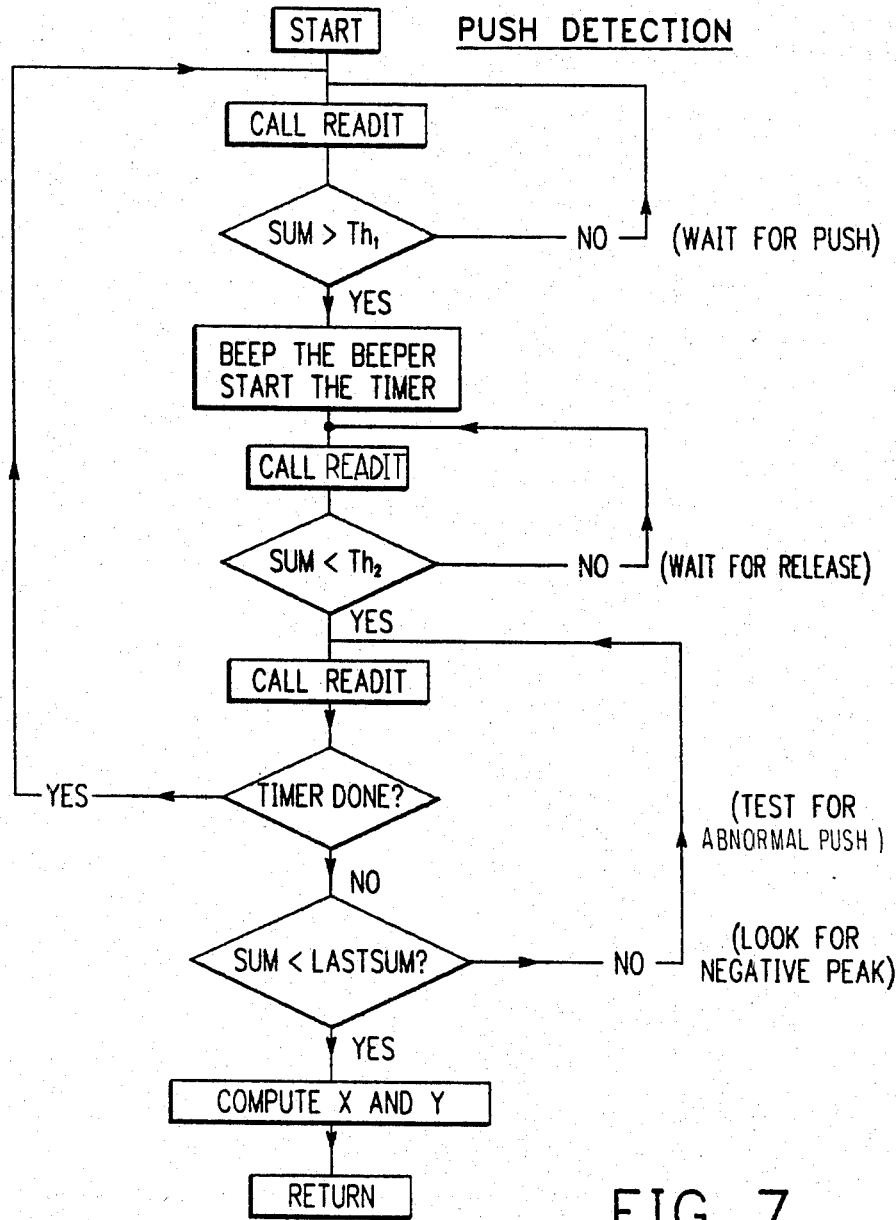
FIG. 7 is a flow chart showing a preferred method of processing the signals produced by the transducers of the data entry device of the invention.
Figure 8:
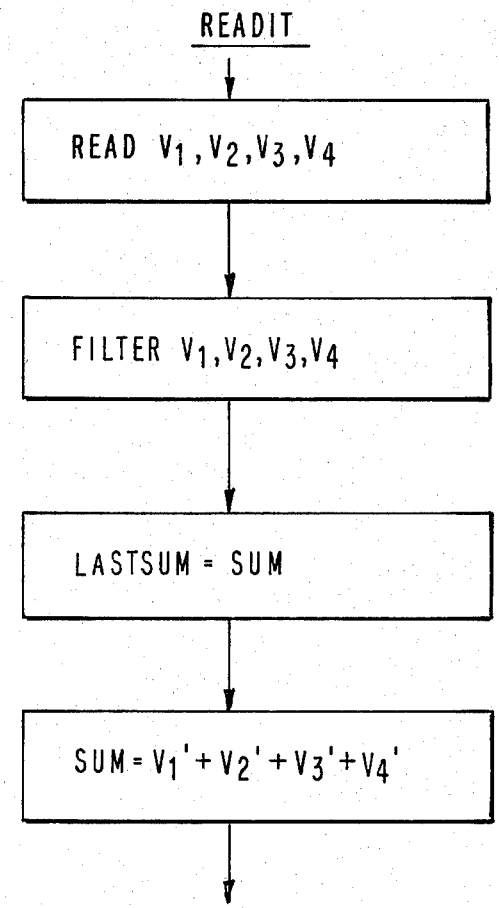
FIG. 8 is a flow chart of a subroutine used in the method of FIG. 7.

The above-discussed operations are summarized in the flowcharts of FIGS. 7 and 8. Referring first to FIG. 7, at the start of the procedure, a subroutine READIT is called and performed. The READIT subroutine is indicated in FIG. 8. This subroutine consists of four steps. First, the values $V_1$ to $V_4$, which are the digital values inputted to the computer 60 representative of the then-present analog signals from the outputs of the respective second amplifiers 55, are read and stored. A digital low-pass filtering operation is performed on each of $V_1$ to $V_4$ to eliminate unwanted high frequency components. There are a number of digital filtering techniques which are acceptable for use with the invention. For instance, each of $V_1$ to $V_4$ can be filtered by executing either of the following formulas:

$$V_i'(n) = V_i'(n-1) + [V_i(n) - V_i'(n-1)]/K,$$

or $$V_i'(n) = V_i'(n-1) + [K \cdot V_i(n) - V_i'(n-1)]/K,$$

where $V_i'(n)$ is the n-th filtered sample of the i-th one of $V_1$ to $V_4$ and K is constant. In accordance with another important aspect of the invention, the value of the constant K should be chosen so that the effective cutoff frequency effected by digital filtering is significantly lower than that of the analog filters in the circuit of FIG. 5. The reason for this is that nonuniformities among sensor outputs caused by differences in analog filter component values are thereby reduced, thus providing a high accuracy in the device output without having to carefully match analog components.

In the third step of the READIT subroutine, a variable LASTSUM is set equal to the previous value of SUM ($=V_1' + V_2' + V_3' + V_4'$). In the final step, the present value of SUM is computed by summing the filtered values $V_1'$ to $V_4'$ computed in the present iteration of the READIT subroutine.

Figure 6B:
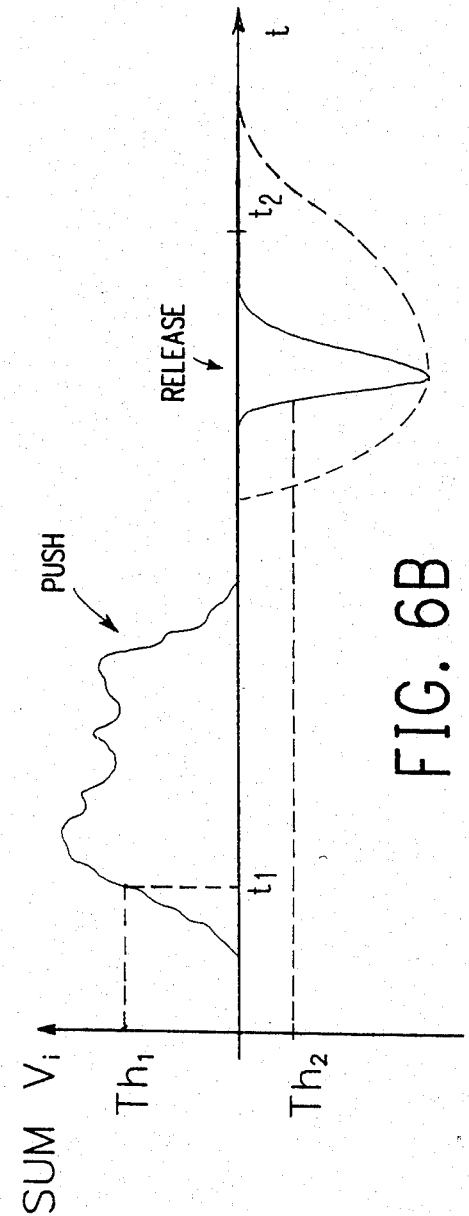

Returning to FIG. 7, after the first iteration of the READIT subroutine, a test is made as to whether the present value of SUM has exceeded the first threshold value $Th_1$. If it has not, an acceptable push has not occurred, and the routine is returned to its start. If $Th_1$ has been exceeded, feedback such as activating a beeper is effected, and the timer for detecting abnormal release pulses is started. The READIT subroutine is again executed. If $Th_2$ has not been exceeded, the READIT subroutine is repeatedly carried out until $Th_2$ is exceeded, that is, until an acceptable release pulse has been found. Once $Th_2$ has been exceeded, the search for the peak of the summed released pulses is effected. This is done by again executing the READIT subroutine successively. If the timer has not run out, that is, if $t_2 - t_1$ as indicated in FIG. 6B has not exceeded a preset time limit $T_o$, a test is continuously conducted to determine whether the present value of SUM has fallen below its previous value LASTSUM. Once this occurs, X and Y are computed using the present values of $V_1'$ to $V_4'$. If the timer does run out before SUM falls below LASTSUM, the procedure is returned to the start point to await a new push by the user.

Figure 1:
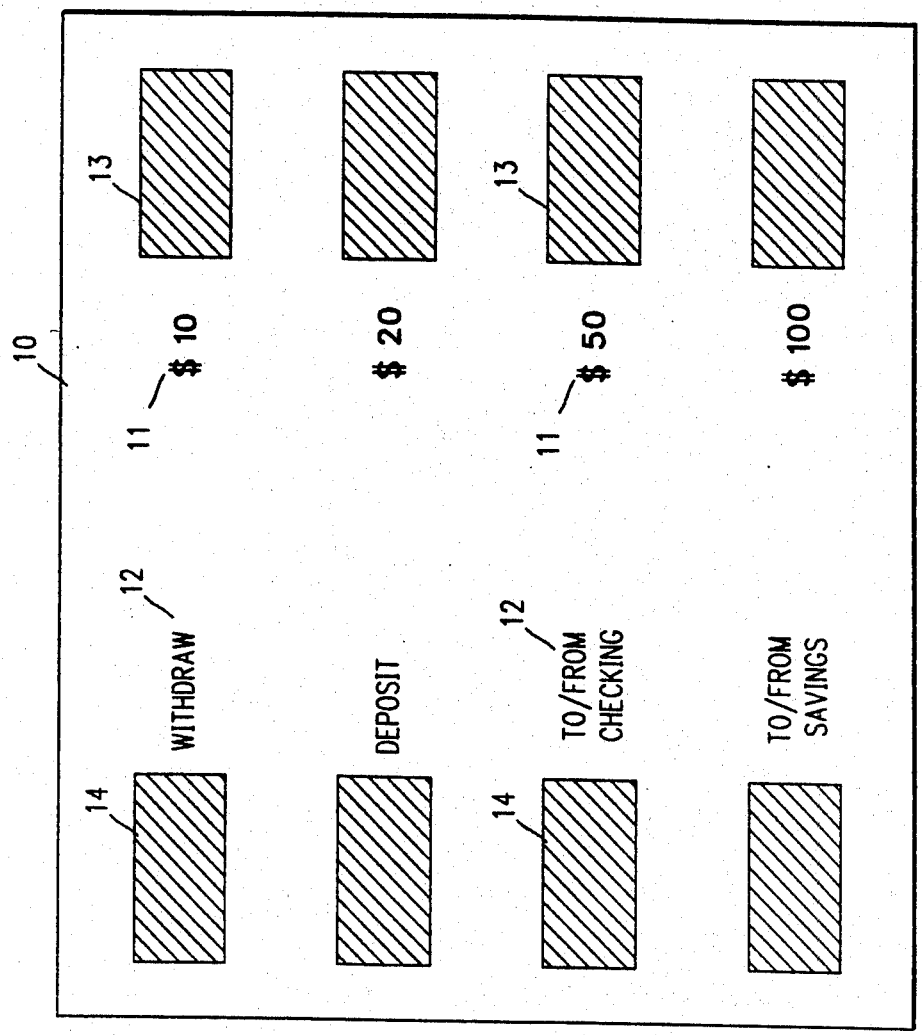
FIG. 1 is a front view showing an example of a displayed pattern which may be utilized with the data input device of the invention.

X and Y can be computed using the following formulas:

$$X = (W/2)[(V_2'(N) + V_3'(N)) - (V_1'(N) V_4'(N))]/[V_1'(N) + V_2'(N) + V_3'(N) + V_4'(N)],$$

and $$Y = (H/2)[(V_1'(N) + V_2'(N)) - (V_3'(N) + V_4'(N))]/[V_1'(N) + V_2'(N) + V_3'(N) + V_4'(N)],$$

where W is the width of the faceplate between two horizontally adjacent sensors, H is the height of the faceplate between two vertically adjacent sensors, and the index N indicates the values of $V_1'$ to $V_4'$ at the instant that the peak of the summed release pulses is found. The values of X and Y so determined can then be utilized, for instance, to determine which of the menu items the user has chosen simply by comparing them with lists or formulas which define the boundary areas of the soft keys 13 and 14 indicated in FIG. 1.

Variations on the above-described procedure are also possible within the scope of the invention. For example, instead of digital filtering as described above, substantially the same effect can be obtained by storing a number of sequential positional values from the sensors, for instance, five to 10 values, and averaging them.

Figure 9:
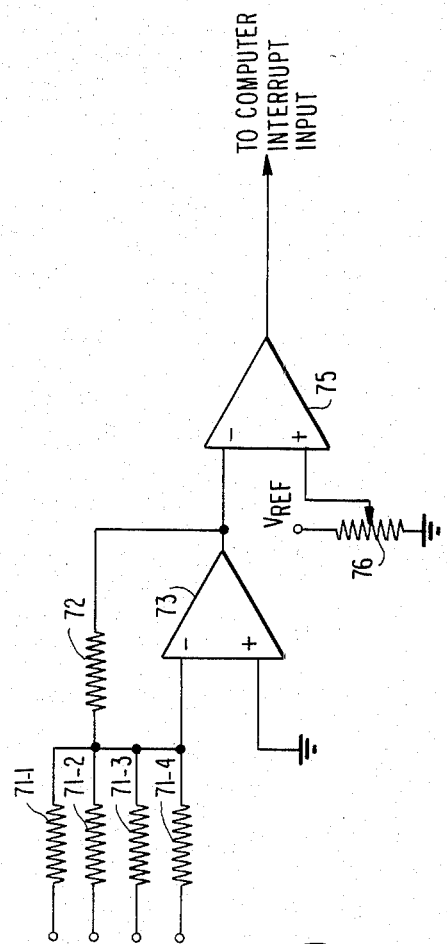
FIG. 9 is a schematic diagram of an electronic circuit used to produce interrupt signals.

Further, to avoid having to make the computer system continuously sequentially test to see whether an input frm the data entry device is available, an interrupt generating circuit may be provided as shown in FIG. 9. In this circuit, outputs from each of the sensors 30-1 to 30-4 are summed at the input of an operational amplifier 73 through identical resistors 71-1 to 71-4. The gain of the amplifier 73 is determined by a feedback resistor 72 having, for example, a resistance equal to a fourth of the resistance of one of the resistors 71-1 to 71-4. The output from the amplifier 73 is compared with a fixed reference voltage from a variable resistor 76 by a comparator 75. When the output of the amplifier 73 exceeds the reference voltage, an interrupt signal is generated.

Yet further, it is advantageous to use a calibration procedure when the device is first put into operation, and possibly at subsequent maintenance times. For a faceplate with three sensors, or for a symmetrical faceplate with four sensors (or for a symmetrical faceplate with any number of sensors arranged on a regular polygon), this may be accomplished by applying a known force to the center of the faceplate, measuring the outputs from the sensors, determining from the measured outputs appropriate scale factors to make the outputs uniform, and multiplying the subsequent active outputs of the sensors by the same respective scale factors.

This completes the description of the preferred embodiments of the invention. Although preferred embodiments have been described, it is believed that numerous modifications and alterations thereto will be apparent to one of ordinary skill in the art without departing from the spirit and scope of the invention.

We claim:

1. A force-sensing data input device for use with a visual display, comprising:
   a rigid member including a flange portion, side walls extending from said flange portion and an arcuate transparent faceplate joined to said flange portion via said side walls and generally recessed from said flange portion;
   a rigid mounting frame having a central opening for receiving portions of said side walls and said recessed faceplate therethrough, such that said faceplate may closely follow the surface contour of said display and said flange portion confronts said rigid mounting frame;
   a plurality of force-sensing means, each being disposed at a respective predetermined location between said rigid member flange portion and said rigid mounting frame, said force-sensing means holding separated said flange portion and said rigid mounting frame; said force-sensing means being positioned in wells formed in a side of said rigid mounting frame facing said flange, in a manner such that at least interference-sensitive portions of the same are effectively shielded from stray electromagnetic radiation, said rigid mounting frame being formed of a conductive material; and
   spring means for urging said flange portion and said rigid mounting frame toward one another.

2. The data input device of claim 1, wherein said transparent faceplate, said flange, and said side walls are formed integrally with one another.

3. The data input device of claim 1, wherein said transparent faceplate, said flange, and said side walls are integrally molded and formed of a transparent material.

4. The data input device of claim 1, wherein said display device comprises a cathode-ray tube, and wherein said rigid mounting frame is integral with said cathode-ray tube.

5. The data input device of claim 1, wherein each of said force-sensing means comprises a piezoelectric transducer.

6. The data input device of claim 5 wherein interference sensitive portions of said piezoelectric transducers are positioned within said wells generally below a surface of said frame in which said wells are formed.

7. The data input device of claim 6, wherein said force-sensing means further comprise rubber pads, one of said rubber pads being disposed on either side of each of said piezoelectric transducers.

8. The data input device of claim 7, further comprising Be-Cu contacts formed on opposed sides of said piezoelectric transducers.

9. The data input device of claim 5, wherein said piezoelectric transducers are formed of lead-zirconium titanate.

10. The data input device of claim 1, wherein said spring means comprises a plurality of spring clips.

11. The data input device of claim 10, wherein grooves are formed on outer surfaces of said flange and said rigid mounting frame for receiving portions of said spring clips.

12. The data input device of claim 1 wherein said faceplate and said opening are generally rectangularly shaped, wherein said wells and said force sensing means are four in number and wherein said wells are formed in said rigid mounting frame corners of said opening.

13. A method for determining a point of application of force on a force-sensing data input device in which a plurality of force-sensing elements are disposed at predetermined positions between an input surface and a reference surface, comprising the steps of:
   summing output signals from each of said force-sensing means;
   detecting a peak value of said sum for a polarity of said sum corresponding to release of said force; and
   determining said position of application of said force in accordance with the values of said output signals of each of said force-sensing means at the time said peak value is detected.

14. The method of claim 13, further comprising the step of inhibiting said step of detecting said peak of said sum unless said sum has first exceeded a first predetermined threshold for a polarity of said sum corresponding to pushing by said force.

15. The method of claim 14, further comprising the step of inhibiting said step of detecting said peak of said sum unless said sum has exceeded in magnitude a second predetermined threshold for said polarity of sum corresponding to said release of said force.

16. A method for determining a point of application of force on a force-sensing data input device in which a plurality of force-sensing means are disposed at predetermined positions between an input surface and a reference surface, comprising the steps of:
   (a) summing outputs from each of said force-sensing means;
   (b) detecting whether said sum of said outputs of said force-sensing means exceeds a first predetermined threshold during a time of pushing by said force;
   (c) if and only if said first threshold is exceeded, determining whether said sum of said outputs of said force-sensing means exceeds a second predetermined threshold of a polarity opposite said first predetermined threshold during release of said force;

(d) if and only if said second threshold is exceeded, detecting a subsequent peak magnitude of said sum of said outputs of said force-sensing means; and (e) determining said point of application of said force in accordance with values of said outputs from said force-sensing means present at the time said peak magnitude of said sum of said outputs is detected.

17. The method of claim 16, further comprising the step of returning to said step (a) if no peak of said sum of said outputs of said force-sensing means occurs within a predetermined period of time following the time said sum of said outputs of said force-sensing means exceeds said first threshold.

18. The method of claim 17, further comprising the step of digitally filtering each of said outputs of each of said force-sensing means prior to said step (a) of summing said outputs.

19. The method of claim 18, wherein said step of digital filtering comprises determining sequential values of each of said output signals in accordance with the formula:

$$V_i'(n) = V_i'(N-1) + [V_i(n) - V_i'(n-1)]/K,$$

where $V_i(n)$ is an n-th sample of an i-th one of said outputs of said force-sensing means, $V_i'(n)$ is a filtered value of $V_i(n)$, and K is constant.

20. The method of claim 19, further comprising the step of analog filtering each of said outputs of each of said force-sensing means prior to said step of digitally filtering, and wherein an effective cutoff frequency for said step of digitally filtering is lower than an effective cutoff frequency for said step of analog filtering.

21. The method claim 18, wherein said step of digitally filtering comprises determining values of each of said output signals in accordance with the formula:

$$V_i(n) = V_i'(n-1) + [K \cdot V_i(n) - V_i'(n-1)]/K,$$

where $V(n)$ is an n-th sample of an i-th one of said output signals of said force-sensing means, $V_i'(n)$ is a filtered value of $V(n)$, and K is a constant.

22. The method of claim 21, further comprising the step of filtering each of said outputs of each of said force-sensing means prior to said step of digitally filtering, and wherein an effective cutoff frequency for said step of digitally filtering is lower than an effective cutoff frequency for said step of analog filtering.

23. The method of claim 18, further comprising the step of providing sensory feedback to a user when said first threshold is exceeded.

24. The method of claim 18, wherein said step of detecting said subsequent peak magnitude of said sum comprises:

continuously determining values of said sum at predetermined intervals;

comparing each value of said sum so determined with an immediately previous value of said sum; and detecting when a value of said sum falls below in magnitude said immediately previous value of said sum.

25. The method of claim 16, further comprising the steps of: prior to said step (a), (1) summing a predetermined number of sequential values of said outputs of each of said force sensing means for each of said outputs of said force-sensing means; (2) averaging each sum of sequential values obtained in said step (1); and utilizing the averages obtained in said step (2) as respective ones of said outputs in said steps (a) to (e).

26. The method of claim 16, wherein said predetermined number is in a range of five to 10.

27. The method of claim 16, further comprising the steps of: applying a force to a center of said input surface; for each of said outputs of said force sensing means, determining a scale factor therefor such that all said outputs of said force sensing means are equal when multiplied by the respective scale factor; and multiplying subsequent values of each of said outputs of said force sensing means by the respective one of said scale factors.

28. The method of claim 10, further comprising the steps of: producing a signal representing a sum of said outputs of said force-sensing means; comparing said signal representing said sum with a fixed reference value; and if and only if said signal representing said sum exceeds said predetermined reference value, performing said steps (a) to (e).

29. In a force sensitive input device for translating the location of a localized data input force applied to an essentially planar area member into data for machine computation, wherein said planar area member is supported with respect to a reference at at least three points by separate force sensors, the improvement comprising in combination means for establishing a sum of the output signals from each of said force sensors, means for detecting a peak value of said sum in a polarity corresponding to a release of said data input force, and means for determining a position of application of said data input force in accordance with a value of an output signal from each said force sensor at a time of detection of said peak value.

30. The input device of claim 29 including means providing essentially constant compressive force on all said force sensors, said stress being as great as any tensile vector component of data input force applied to said planar area member outside lines enclosing on are within said force sensors.

* * * * *

UNITED STATES PATENT AND TRADEMARK OFFICE
CERTIFICATE OF CORRECTION

PATENT NO. : 4,511,760

DATED : April 16, 1985

INVENTOR(S) : Richard L. Garwin and James L. Levine

It is certified that error appears in the above-identified patent and that said Letters Patent is hereby corrected as shown below:

Column 12, line 54, "on are" should read --an area--.

Signed and Sealed this

Eleventh Day of February 1986

[SEAL]

Attest:

DONALD J. QUIGG

Attesting Officer

Commissioner of Patents and Trademarks